United States Patent
Michiels

(10) Patent No.: US 6,761,483 B1
(45) Date of Patent: Jul. 13, 2004

(54) COMBINED RADIAL-AXIAL SLIDE BEARING

(75) Inventor: Mark Walter Elza Michiels, Antwerp (BE)

(73) Assignee: Atlas Copco Airpower, Wilrijk (BE)

( * ) Notice: Subject to any disclaimer, the term of this patent is extended or adjusted under 35 U.S.C. 154(b) by 28 days.

(21) Appl. No.: 10/069,979

(22) PCT Filed: Sep. 12, 2000

(86) PCT No.: PCT/BE00/00103
§ 371 (c)(1),
(2), (4) Date: Jul. 8, 2002

(87) PCT Pub. No.: WO01/20179
PCT Pub. Date: Mar. 22, 2001

(30) Foreign Application Priority Data

Sep. 14, 1999 (BE) .............................. 9900610

(51) Int. Cl.⁷ .............................................. F16C 32/00
(52) U.S. Cl. ...................................... 384/107; 384/113
(58) Field of Search ................................. 384/100, 107, 384/113, 228, 420, 424, 425, 426

(56) References Cited

U.S. PATENT DOCUMENTS

| | | | | |
|---|---|---|---|---|
| 2,502,173 A | * | 3/1950 | Potts ........................... | 384/114 |
| 2,756,114 A | * | 7/1956 | Brunzel ........................ | 384/107 |
| 3,998,502 A | * | 12/1976 | Walter et al. ................ | 384/107 |
| 4,090,743 A | * | 5/1978 | Suzuki et al. ................ | 384/113 |
| 4,438,339 A | * | 3/1984 | McHugh ...................... | 290/1 R |
| 6,494,620 B1 | * | 12/2002 | Sawaguchi et al. ......... | 384/107 |

FOREIGN PATENT DOCUMENTS

| FR | 2 084 515 | * 12/1971 |
|---|---|---|
| JP | 3-292413 | * 12/1991 |

* cited by examiner

Primary Examiner—William C. Joyce
(74) Attorney, Agent, or Firm—Bacon & Thomas, PLLC

(57) ABSTRACT

The slide bearing is constructed of, on one hand, a hydrodyamic radial slide bearing (2) which surrounds, with a play, an axle (1) to be beared, such that between the axle (1) and the radial slide bearing (2), a first gap (9) is formed which is in connection with a source of liquid under pressure and, on the other hand, at least one hydrostatic axial slide bearing (3) which is situated with a play opposite to a radially extending surface portion (6) of the axle (1), such that also between this portion (6) of the axle (1) and a radially directed portion (12) of the axial slide bearing (3), a second gap (13) is formed which is in connection with the first gap (9).

9 Claims, 1 Drawing Sheet

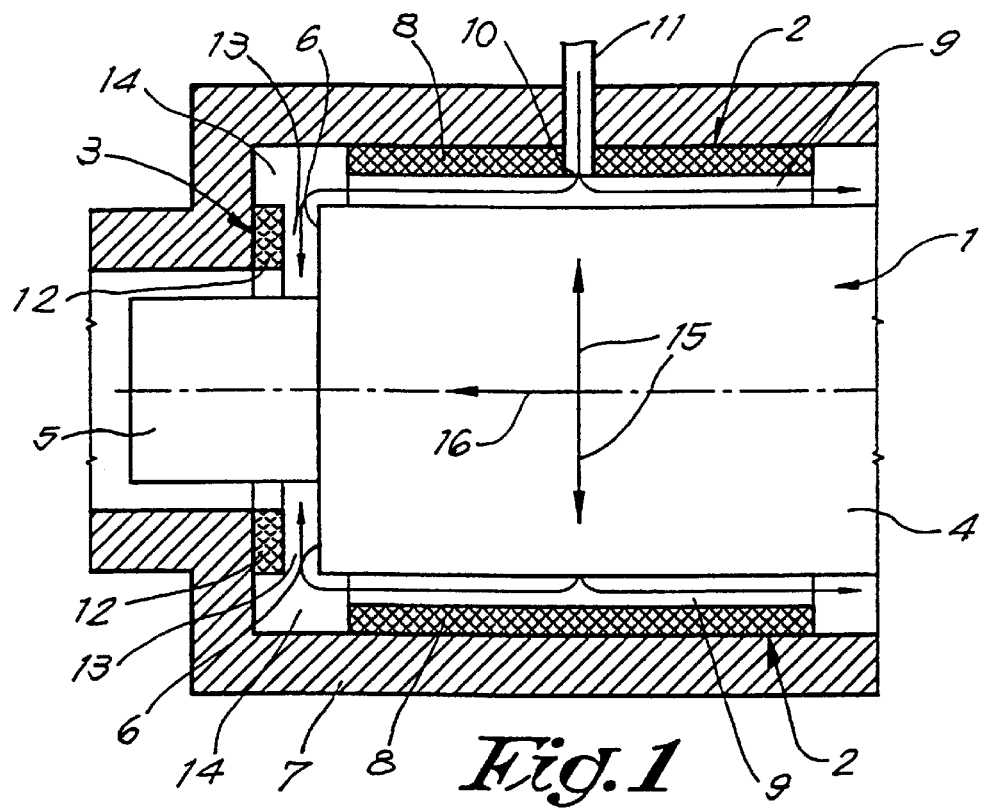
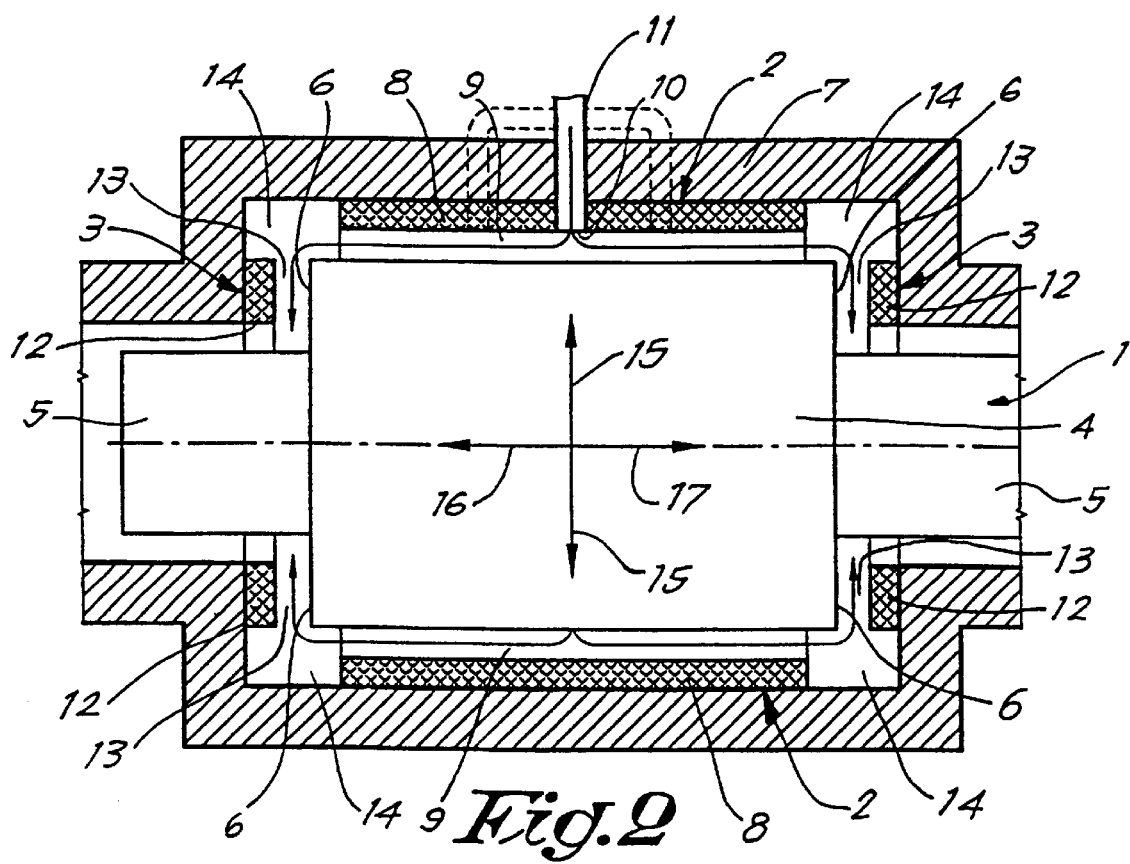

COMBINED RADIAL-AXIAL SLIDE BEARING

BACKGROUND OF THE INVENTION

This invention relates to a combined radial-axial slide bearing.

A possible form of a liquid-lubricated axial slide bearing is a hydrostatic bearing whereby use is made of an external power source supplying the liquid under pressure to the slide bearing.

This liquid is brought into the bearing by means of a flow restrictor or restrictor, such as a capillary or a small opening.

The principle of such hydrostatic bearing is based on the fact that, when the gap of the bearing becomes smaller, the flow diminishes and the pressure drop over the restrictor is reduced. The pressure in the gap increases, and the force which caused the gap to narrow is compensated.

These hydrostatic bearings have a high loading capacity depending on the feeding pressure of the liquid, a high stiffness and a carrying capacity which is little dependent on the number of revolutions.

Especially if the lubricating liquid has a low viscosity, such as water, this restrictor, however, has to be very small, as a result of which this latter becomes very sensitive to obstructions.

In such bearing, the tolerances are very narrow, especially with water, in consideration of the fact that, in order to limit the flow rate, the gap of the bearing has to be as small as possible.

Moreover, due to this restrictor, the construction of the axial bearing is rather complex and this bearing is expensive, whereas in most cases a pump has to be applied in order to obtain sufficient pressure.

One of the forms of a radial slide bearing lubricated with a liquid is the hydrodynamic bearing, whereby the movement of the axle itself provides for the necessary pressure of the lubricating liquid.

The bearing surrounds the axle with a little play in between. When a radial force effects on the axle, the axle will situate itself excentrical, as a result of which a wedge is formed. Under the influence of the revolving movement of the axle, the liquid is pressed into this natural narrowing, as a consequence of which a pressure build-up is resulting. This pressure build-up will lift the axle and provide for that the force which displaced the axle is counteracted. Thus, it is so that in balance, the axle will not be centered, as otherwise no pressure could be build up. Ideally, the excentricity is between 60% and 90%.

Such hydrodynamic bearings are rather simple and inexpensive, although they require narrow manufacturing tolerances. They are operationally reliable, however, they have no high loading capacity and rigidity. It is, however, disadvantageous that their loading power depends on the number of revolutions and that, during starting, there is a contact between the axle and the bearing and therefore wear and tear does occur.

It is, however, also known to combine a hydrostatic axial and a hydrostatic radial bearing to a single slide bearing.

Such combined radial-axial slide bearing is described, amongst others, in the British patent No. 639.293.

An axle which is provided with two collars in between which a stationary ring with a small play is provided and which is provided with a number of recesses in its internal circumference, at which, by means of a restricting mouthpiece, a restrictor is formed and to which a fluid, such as air or steam, is supplied.

This fluid flows through the recesses up to the collar and thus forms a fluid layer around the axle, such that this latter is radially borne. This fluid flows radially outward through the gap formed by the play between the extremities of the ring and the collar and prevents the contact between the ring and the collar or, in other words, provides for the axial bearing.

In fact, the aforementioned British patent describes a hydrostatic radial bearing which is fed by means of several narrowings feeding to different chambers around the bearing. Instead of feeding the hydrostatic axial bearing by means of a separate narrowing, use is made of the narrowing which is formed by providing the narrowing of the radial bearing in series with the radial bearing itself.

Due to the presence of the mouthpieces forming a narrowing or restrictor, this known combined bearing, however, possesses the same disadvantages as the aforementioned axial bearings, with thus, amongst others, the danger of obstruction of these narrowings.

SUMMARY OF THE INVENTION

The invention aims at a combined radial-axial slide bearing which does not show these disadvantages and therefore causes no danger of obstruction of a capillary or mouthpiece and which is relatively inexpensive and compact.

According to the invention, this aim is achieved in that the combined bearing is composed of, on one hand, a hydrodynamic radial slide bearing which surrounds an axle to be beared with a play, such that between the axle and the radial slide bearing, a first gap is formed, which first gap is in connection with a source of liquid under pressure and, on the other hand, at least one hydrostatic axial slide bearing which, with a play, is situated opposite to a radially extending surface portion of the axle, such that also between this last-mentioned surface portion of the axle and a radially-directed portion of the axial slide bearing, a second gap is formed, whereby this second gap is in connection with the first gap, such that this axial slide bearing is fed by means of the first gap and this first gap fulfils the function of restrictor for the axial slide bearing.

In that the first gap takes the function of restrictor for the axial slide bearing, no external restrictor is required, such that all above-mentioned disadvantages, which are a consequence of such external resistor, are eliminated.

The first gap and the second gap do not necessarily have to be in direct connection with each other. They can do so by means of a chamber between the axle and a bearing housing.

A portion of this housing can border the gaps directly. The housing can be provided also at the inside with one or more bearing cushions or such, which border a gap.

The combined bearing can be singular and comprise a single axial slide bearing at an extremity of the radial bearing, whereby, thus, the second gap is in connection with one extremity of the first gap, however, in a variant this combined bearing is double-sided and comprises two axial slide bearings, one at each extremity of the radial slide bearing, whereby the second gaps of the two axial slide bearings are in connection with respectively the two extremities of the first gap.

In this latter case, the connection of the first gap to the source of liquid under pressure preferably gives out in the center of the first gap on two locations which are situated symmetrical in respect to the middle of the first gap.

In the other case with one axial bearing, the aforementioned connection can give out at any location in the first gap, whereby the pressure drop in this gap for one and the same flow rate of liquid depends on the position of this location.

DESCRIPTION OF THE DRAWINGS

With the intention of better showing the characteristics of the invention, hereafter, by way of example without any limitative character, two preferred forms of embodiment of a combined radial-axial slide bearing according to the invention are described, with reference to the accompanying drawings, wherein:

FIG. 1 schematically represents a cross-section of an axle beared by means of a combined slide bearing according to the invention;

FIG. 2 schematically represents a cross-section according to that from FIG. 1, however, in respect to another form of embodiment of the combined slide bearing according to the invention.

DESCRIPTION OF THE INVENTION

In FIG. 1, an axle 1 or, more specifically, an extremity of this axle 1 is represented which is beared radially and axially in a water-lubricated combined radial-axial slide bearing 2–3.

This axle 1 is fixed, for example, to one of the rotors of a water-lubricated compressor element and, in respect to the axial mode of bearing, shows an abrupt alteration of diameter.

It therefore comprises a portion 4 with a larger diameter and a portion 5 having a smaller diameter and forming the free extremity, such that in between these portions 4 and 5, a radially-directed shoulder or, in other words, a radially-directed surface portion 6 is formed.

The combined slide bearing 2–3 substantially consists of a hydrodynamic radial slide bearing 2 surrounding the portion 4 with the largest diameter, and of a hydrostatic axial slide bearing 3, which are formed in a bearing housing 7.

The radial slide bearing 2 comprises a bearing cushion 8 surrounding the portion of the axle 1 with a play, such that in between them, a first narrow gap 9 is created.

The mouth 10 of a supply conduit 11, extending through the slide bearing 2, for water under a pressure $P_{in}$, which conduit is connected to a source of water under pressure not represented in FIG. 1, for example the conduit with water for the injection onto the rotors of the compressor, gives out onto this gap 9.

This hydrodynamic radial slide bearing 2 has been calculated according to known standard methods, for example, the method of Summerfeld as described, amongst others, in "Machine-onderdelen" by Roloff/Matek, p. 450–473, whereby the operating conditions, the building-in possibilities, the applied lubricant, which, in the given example, is water, have been taken into consideration.

The axial slide bearing 3 comprises a ring-shaped bearing cushion 12 which is fixed opposite to the aforementioned radial surface portion 6 of the axle 1 against an also radially-directed portion of the interior wall of the bearing housing 7, whereby in between this bearing cushion 12 and the surface portion, a second gap 13 is formed. This bearing cushion 12 thus forms a radially-directed portion of the slide bearing 3.

This second gap 13 is in connection with the aforementioned first gap 9, by means of a ring-shaped closed chamber 14 which is formed in between the two bearing cushions 8 and 12, between the interior side of the bearing housing 7 and the axle 1.

This axial bearing 3, too, has been calculated according to standard methods for hydrostatic axial slide bearings which are fed by a restrictor, such as, amongst others, described in "Machine-onderdelen" by Roloff/Matek, p. 473–479, however, with the difference that instead of the diameter of an opening or capillary, the distance from the aforementioned mouth 10 in the first gap 9 up to the chamber 14 at the extremity of this gap 9 is used as a parameter.

In this classic calculation, the equation for calculating the pressure drop over the restrictor is replaced by an equation describing the pressure drop in the assembly described heretofore. The pressure drop over the bearing can be calculated in a simplified manner by means of the following equation:

$$\Delta P = Q.12 \text{visco}.L/(0,5\ S)^3.\Pi.D$$

wherein:

Q=flow rate visco=viscosity of the medium

L=distance from the openings up to the edge of the bearing

D=diameter of the radial bearing

S=diametrical play of the radial bearing $\Delta P$=pressure drop over the bearing: $P_{in}-P_{ax}$.

The functioning of the combined slide bearing 2–3 is as follows:

The radial slide bearing 2 normally functions as a hydrodynamic bearing, this means that the liquid which is fed into the gap 9 under the pressure $P_{in}$, forms a ring-shaped layer under the influence of the rotation of the axle 1, whereby thus the axle is lifted up into balance position, as represented in FIG. 1 by arrows 15. In this balance position, the axle 1 is not centered in the radial bearing 2.

The axial slide bearing 3 is fed by water which is flowing from the mouth 10 in the first gap 9 of the radial slide bearing 2. As this gap 9 is very narrow, a pressure drop $\Delta P$, which is equal to the flow rate, is created over the traject between this mouth 10 and the chamber 14.

In this chamber 14, and thus also at the entry of the second gap 13 of the hydrostatic axial slide bearing 3, a pressure $P_{ax}=P_{in}-\Delta P$ is prevailing.

Due to the pressure build-up during operation, the rotor and therefore also the axle 1 shall be pushed axially into the direction. The axial forces on the axle 1 are indicated in FIG. 1 by arrow 16.

As a consequence of these axial force, the axle 1 will be inclined to move into the direction of arrow 16. When, however, the width of gap 3 diminishes, the water flow rate through this gap 13, but also through the first gap 9 will diminish, as a result of which the pressure drop $\Delta P$ diminishes.

From the aforementioned equation can be deduced that as a result of this, the pressure $P_{ax}$ increases, which has as a consequence that the aforementioned axial force is counteracted until a balance is obtained.

When the axial force drops under this balance, the width of the gap 13 will increase, as a result of which the water flow rate increases and the pressure drop $\Delta P$ is enlarged. Hereby, also the pressure $P_{ax}$ diminishes until a balance is obtained again.

Thus, the first gap 9 takes over the roll of opening or capillary for the axial slide bearing 3.

It is clear that the pressure drop ΔP depends on the length of the portion of the gap 9 between the mouth 10 and the chamber 14. In FIG. 1, this mouth 10 is represented in the center of the gap 9, however, by moving this mouth 10 towards the axial slide bearing 3 or away from this slide bearing 3, this pressure drop ΔP, with a same flow rate, will diminish, increase, respectively.

When calculating the axial slide bearing 3, it is provided for that, if the width of gap 13 is minimum, which depends on the stroke and the angularity of the axial slide bearing 3 and on the roughness of the surfaces, the pressure $P_{ax}$ is as high as possible and, as a consequence, the pressure drop ΔP is minimum. However, there still must be a water flow rate which is large enough to dissipate the frictional heat.

With a maximum width of the gap 13, which may not be too large, the aforementioned pressure $P_{ax}$ has to be as low as possible and, as a consequence, the pressure drop ΔP has to be maximum.

The form of embodiment represented in FIG. 2 differs from the form of embodiment described heretofore in that the combined bearing 2–3 is double-sided, this means, it can take up axial forces as well in the direction indicated by arrow 16 as in the opposite direction, represented by arrow 17 in figure 2, and to this aim comprises, apart from one radial slide bearing 2, two axial slide bearings 3 which are identical to the bearings 2, 3 respectively, described heretofore.

The axle 1 comprises two portions 5 with smaller diameter, whereby thus between the thicker portion 4 and each of the portions 5 a shoulder is formed and thus a radially-directed surface portion 6, opposite to which an axial bearing 3 is situated.

By means of a chamber 14, the gaps 13 of the two radial slide bearings 3 are connected to respectively both extremities of the gap 9 of the radial slide bearing 2.

The water which is fed into the gap 9 at the pressure $P_{in}$ splits up into two flows with a well-defined flow rate, one towards each gap 13.

The radial slide bearing 2 functions as in the form of embodiment according to FIG. 1. Also the two axial slide bearings 3 function in the same manner as described heretofore, whereby, however, the width of the one gap 13 diminishes when the width of the other increases, and reverse.

Usually, the mouth 10 in the middle between the two axial slide bearings 3 is chosen and these latter equal to each other, such that in balance position, the two gaps 13 will be equally wide and the flow rates towards these gaps 13 will be equal. As soon as there is a deviation from this balance, one flow rate shall be higher than the other, as a result of which the pressures $P_{ax}$ will be different and the too large axial pressure will be counteracted.

In a variant, the supply conduit 11 is splitting into two at the extremity, and there are thus two mouths 10 which, as is represented in dashed line in FIG. 2, give out in the gap 9 symmetrically in respect to the middle between the two axial slide bearings 3.

The liquid brought into the gap 9 by means of the supply conduit 11 not necessarily has to be water. It may, for example, also be oil or another lubricating liquid.

The gaps 9 and 13 do not necessarily have to be in connection by means of a chamber 14. Possibly, they can directly be connected to each other.

The invention is in no way limited to the forms of embodiment described heretofore and represented in the figures, on the contrary may such combined radial-axial slide bearing be realized in different variants without leaving the scope of the invention.

What is claimed is:

1. Combined radial-axial slide bearing comprising:

a hydrodynamic radial slide bearing surrounding an axle to be borne with a play, such that between the axle and the radial slide bearing, a first gap is formed, the first gap in connection with a source of liquid under pressure; and at least one hydrostatic axial slide bearing having a play and situated opposite to a radially extending surface portion of the axle such that between the surface portion of the axle and a radially-directed portion of the axial slide bearing a second gap is formed, wherein the second gap is in communication with the first gap such that the axial slide bearing is fed by means of the first gap, first gap fulfilling the function of a restrictor for the axial slide bearing.

2. Combined radial-axial slide bearing according to claim 1, characterized in that the first gap and the second gap are in communication with each other by means of a chamber between the axle and a bearing housing.

3. Combined radial-axial slide bearing according to claim 1, comprising a single axial slide bearing at an extremity of the radial bearing, and wherein the second gap is in communication with one extremity of the first gap.

4. Combined radial-axial slide bearing according to claim 1, and two axial slide bearings are located at opposed ends of the radial slide bearing, and wherein the second gaps of the two axial slide bearings are in communication with respectively the two extremities of the first gap.

5. Combined radial-axial slide bearing according to claim 4, characterized in that the communication of the first gap with the source of liquid under pressure is provided in the center of this gap.

6. Combined radial-axial slide bearing according to claim 4, characterized in that the communication of the first gap with the source of liquid under pressure is provided at two locations which are symmetrically in respect to the center of this gap.

7. Combined radial-axial slide bearing according to claim 1, characterized in that the communication of the first gap with the source of the liquid under pressure comprises a supply conduit with a mouth extending through the radial slide bearing.

8. Combined radial-axial slide bearing according to claim 1, characterized in that the radial slide bearing as well as the axial slide bearing comprise a bearing cushion.

9. Combined radial-axial slide bearing according to claim 1, characterized in that the axle is the axle of a rotor of a compressor.

\* \* \* \* \*